United States Patent [19]

Hodges

[11] 4,163,990
[45] Aug. 7, 1979

[54] COLOR TELEVISION PROJECTION SYSTEM

[76] Inventor: Marvin P. Hodges, 4801 Del Moreno Dr., Woodland Hills, Calif. 91364

[21] Appl. No.: 899,361

[22] Filed: Apr. 24, 1978

[51] Int. Cl.² .................... H04N 9/16; H04N 5/74
[52] U.S. Cl. .................................... 358/64; 358/238
[58] Field of Search ............... 358/60, 64, 237–238

[56] References Cited
U.S. PATENT DOCUMENTS 4,027,328  5/1977  Lessman ............................ 358/64

*Primary Examiner*—Richard Murray
*Assistant Examiner*—Aristotelis M. Psitos
*Attorney, Agent, or Firm*—DeLio and Montgomery

[57] ABSTRACT

A system for projecting a color television image is described which comprises a plurality of cathode ray tubes, each of different monochromatic color and each having an image display screen, an optic having an equal plurality of successive reflective surfaces, each being selectively reflective to one of the different monochromatic colors and positioned such that each surface reflects an image appearing on the display screen of one of the plurality of tubes, and a lens disposed behind the tubes to transmit a composite color image of the images reflected from the successive reflective surfaces.

12 Claims, 11 Drawing Figures

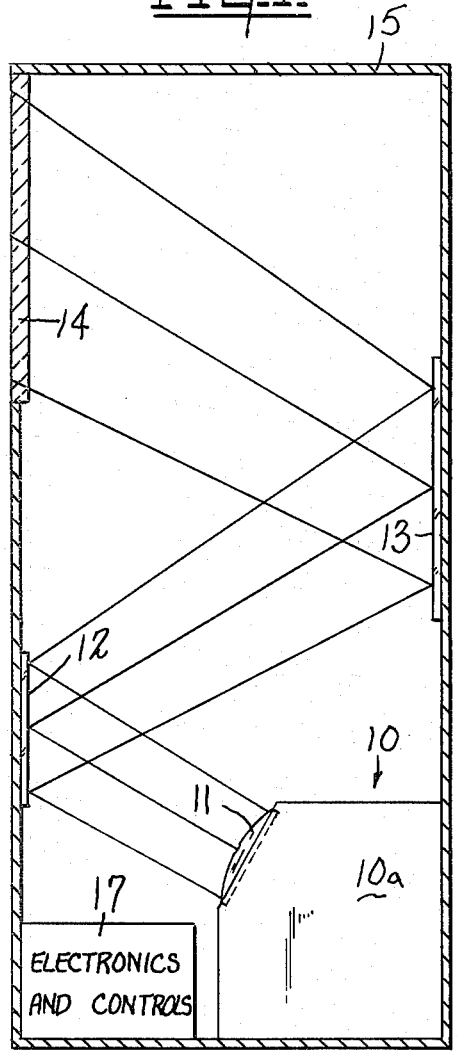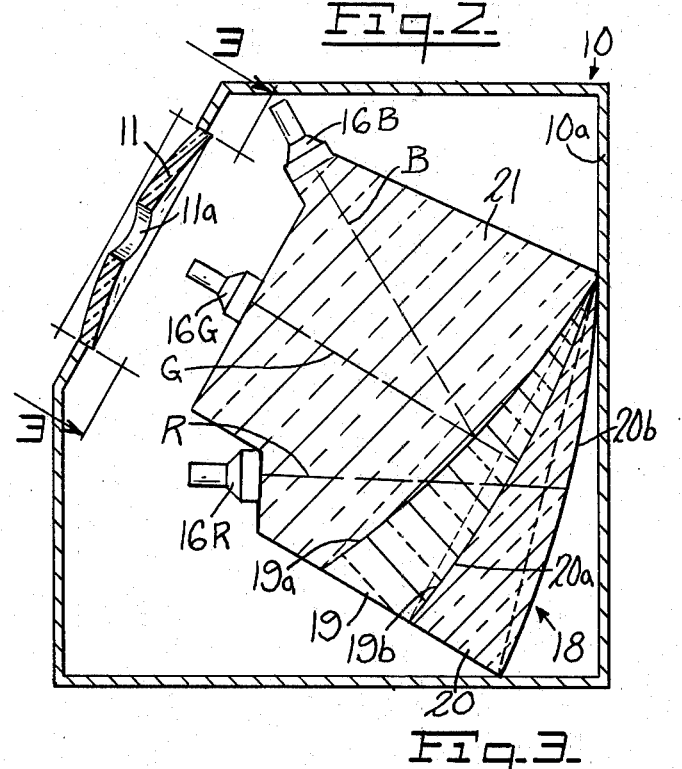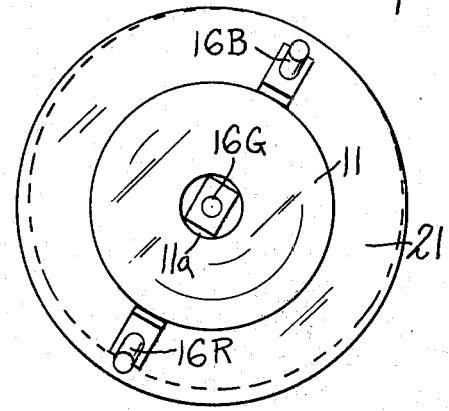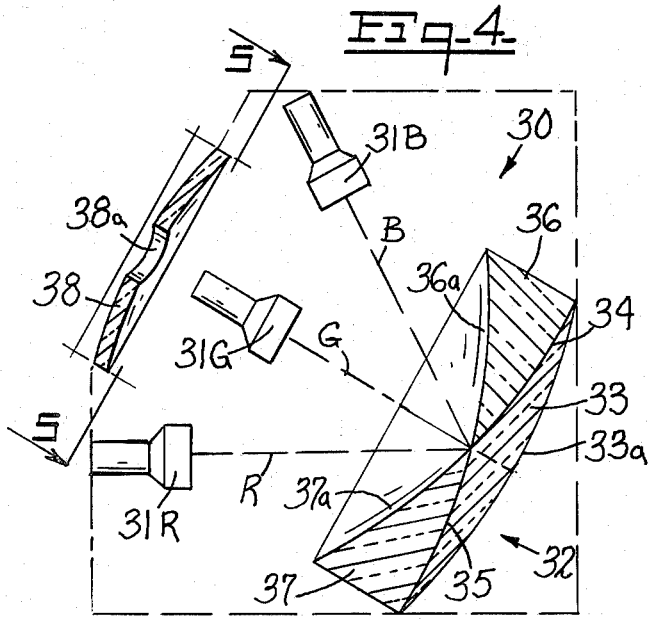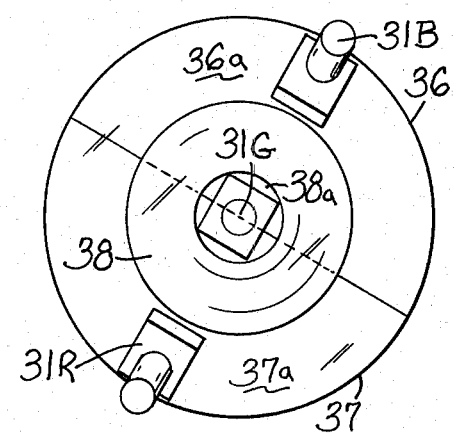

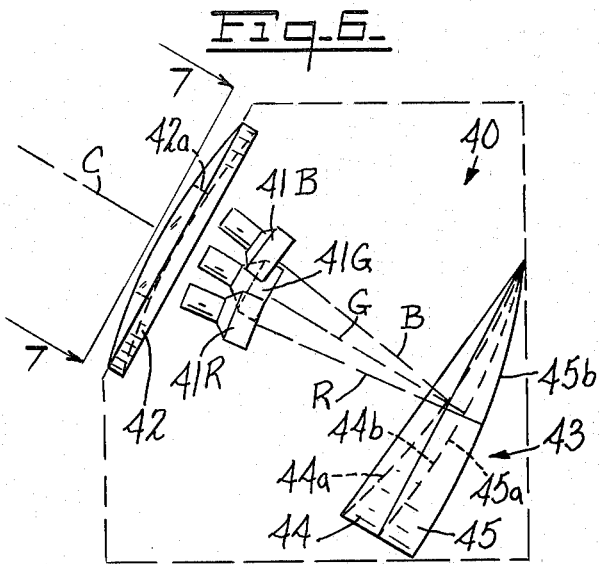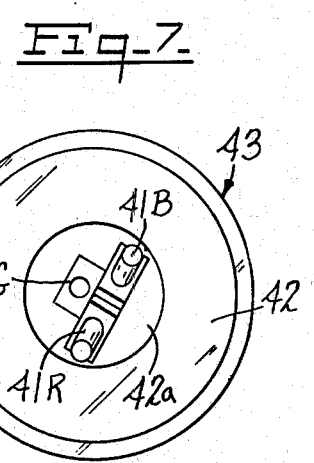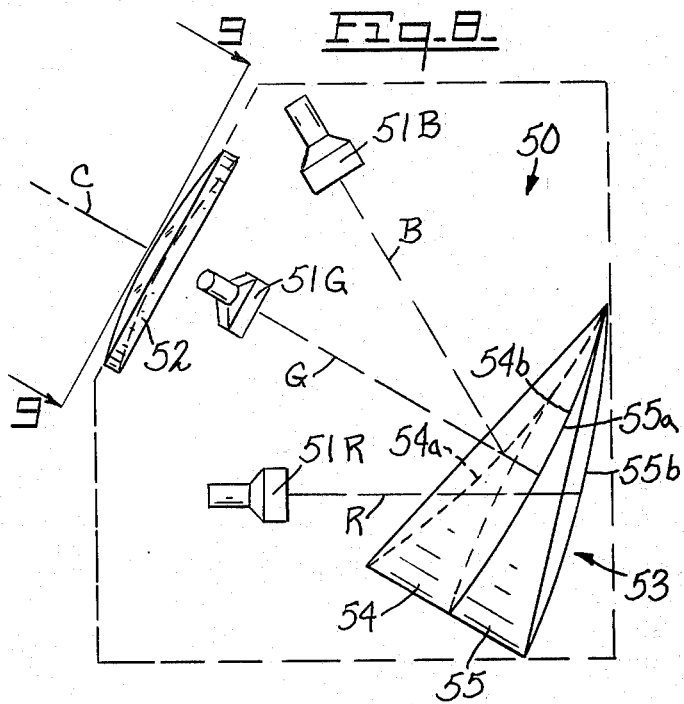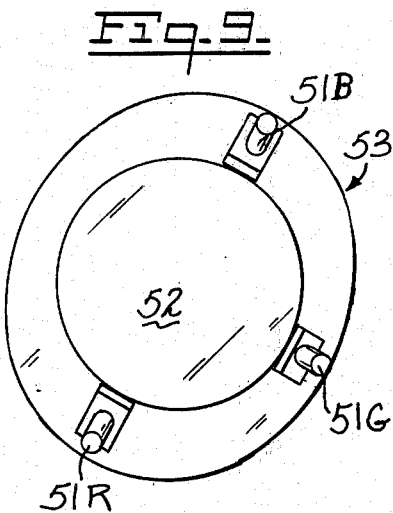

COLOR TELEVISION PROJECTION SYSTEM

This invention relates to television projection systems and more particularly relates to projection systems for color television.

In contemporary color television systems of the single tube direct projection type, luminous and resolution deficiencies of the cathode ray tube (CRT) are largely caused by its required shadow mask structure and limitations related to its use. Typically, less than four percent of the total electrons pass through the shadow mask, phosphors, and coated face plates to become observable brightness by the viewer. Substantial resolution loss can also occur in this system and such loss is essentially the function of the size, shape and structure of the matrix pattern in the shadow mask. This loss of resolution and light is further aggravated by the inability to fabricate a shadow mask whose dots invisibly abut neighboring dots without a skeleton or frame.

Additionally, contemporary color television systems of the single tube direct projection type generally require a relatively long tube from the front to the back. Where larger screens are involved, on the order of twenty-one inches diagonal measurement and greater, the cabinet housing becomes unduly cumbersome and may be difficult to arrange in the average home.

To obtain a larger image, a projection system of the Schmidt type utilizing three small CRTs individually forming red, green and blue component images may be utilized.

The present invention provides a new and improved color projection system of the type utilizing three small CRTs of different color to form a composite color image utilizing a minimum of parts and achieving good registration of the three images on the individual CRTs.

Briefly stated, the invention in one form utilizes an optic having two color selective reflective surfaces and a mirror surface (or three color selective reflective surfaces) which may be formed of only two nested elements whose surfaces provide both color beam splitting and selective color reflection. The CRTs are preferably optically coupled to the optic and positioned to minimize center obscuration of the image forming corrector. The green color is given position preference in some embodiments because of its dominating influence on composite picture quality as perceived by the viewer.

An object of this invention is to provide a new and improved color television system of the Schmidt type.

Another object of this invention is to provide a system of the type described where the color beam splitters and reflectors are combined in one optic.

A further object of this invention is to provide a system of the type described that permits a wide range of electable design options.

The features of the invention which are believed to be novel are particularly pointed out and distinctly claimed in the concluding portion of this specification. However, the invention together with further objects and advantages thereof may best be appreciated by reference to the following detailed description taken in conjunction with the drawings, wherein:

FIG. 1 is a cross-sectional representation of a projection-type color television receiver embodying the invention;

FIG. 2 is a side elevation in section of the image forming system of the receiver of FIG. 1;

FIG. 3 is a view seen from the plane of lines 3—3 of FIG. 2;

FIG. 4 is a view similar to FIG. 2 showing another image forming system embodying the invention;

FIG. 5 is a view seen in the plane of lines 5—5 of FIG. 4;

FIG. 6 is a side elevation of another image forming system embodying the invention;

FIG. 7 is a view seen in the plane of lines 7—7 of FIG. 6;

FIG. 8 is a side elevation showing still another embodiment of the invention;

FIG. 9 is a view seen in the plane of lines 9—9 of FIG. 8; and

Figure 10:
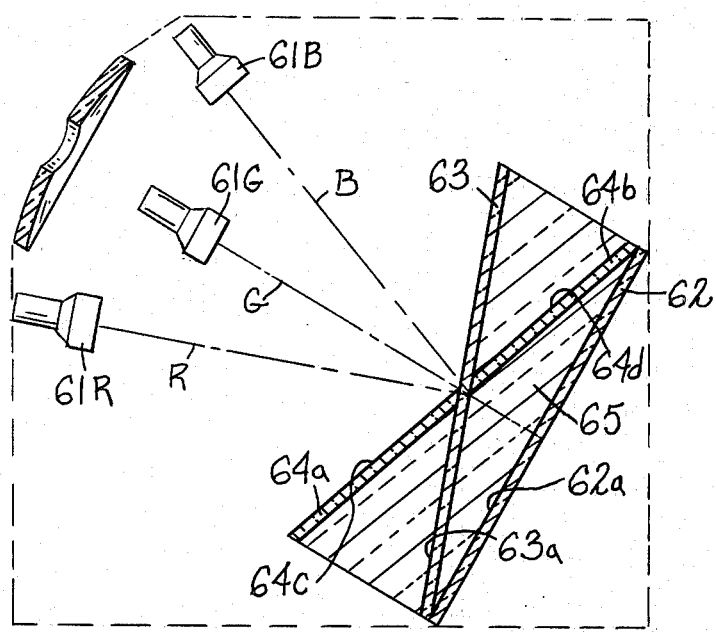
FIGS. 10 and 11 are side elevations in section showing other embodiments of the invention.

FIG. 1 exemplifies a manner in which the invention may be embodied in a closed projection system cabinet. The system embodying the invention 10, hereinafter described, includes a corrector lens 11 which corrects for aberrations in the reflected composite image. The image is reflected by a first mirror 12 to a second mirror 13, and thereafter reflected to the back of a viewing screen 14. The projection system 10, together with the mirrors and viewing screen, are enclosed in a housing 15. This arrangement merely exemplifies an environment of the invention and more or less mirrors may be used. The system 10 in housing 10a (FIG. 2) comprises three cathode ray tubes 16R, 16G, and 16B of a different color phosphor screen; for example, red, green, and blue, respectively. Conventional electronics for each CRT may be enclosed in a sub-housing 17 and have manual controls for brightness, contrast, etc. The CRTs are mounted in fixed relation and position by a suitable support (not shown). Each CRT 16R, 16G and 16B will form on its screen a monochromatic picture of red, green and blue, respectively. The images appearing on the CRTs are directed to a reflective optical system 18 having color selective reflective surfaces. The system 18 preferably comprises two similar optical elements 19 and 20. Element 19 has a concave surface 19a and a convex surface 19b. Element 20 has a concave surface 20a (shown as coincident with surface 19b) which mates with convex surface 19b of element 19. Element 20 has a rear convex surface 20b. Surfaces 19a, 19b, 20a and 20b, as shown in FIG. 2, are all defined on a spherical radius, and all surfaces have the same radii. As shown, all surfaces are concave to the CRTs. The optical axes of surfaces 19b and 20a essentially coincide with the axis G of the green CRT 16G. CRT 16B is positioned so that its axis is essentially coincident with the optical axis of surface 19a. CRT 16R is positioned so that its axis R is essentially coincident with the optical axis of surface 20b. All CRT axes, at the point of intersection with the respective reflecting surface, reside essentially on axis G.

The CRTs 16B, 16G, and 16R, as shown, are equidistant from their respective reflecting surfaces 19a, 19b, or 20a and 20b. However, this is not critical, as hereinafter pointed out.

Surfaces 19b and 20a are optically bonded by a cement of the same index of refraction as the lens elements 19 and 20. An optical coupling medium 21 may optically be provided between the screens of the CRTs and surface 19a. Coupling 21 may be of an acrylic, with the tube screens coupled thereto with a silicone grease. The coupling, if used, may also be an enclosed liquid.

Surface 19a has a color selective reflective coating thereon sensitive only to blue. Such color selective coatings are referred to as dichroic and pass all light except that of a selected color (wavelength). Such reflective surfaces may be considered a color beam splitter. Surface 19b or 20a has a color selective reflective surface thereon sensitive only to green. Surface 20b may be a mirror surface or may have a color selective coating sensitive only to red. The red light passes surfaces 19a, 19b, and 20a, and is the only light reaching surface 20b.

The green tube is provided directly on axis with corrector lens 11. Corrector 11 has the usual opening 11a for such an arrangement due to the on-axis position of the green tube. The green tube may extend through opening 11a if design considerations so require.

In accordance with one aspect of the invention, the green reflector and tube are placed on axis with the corrector. The green color carries the majority of the light and provides a majority of the resolution. Accordingly, corrector 11 is optimized for the on-axis position of the green tube and reflector.

The three color images are reflected by surfaces 19a, 20a and 20b as a composite color image. Corrector lens 11 corrects for aberrations in the composite image and transmits the corrected image to the mirror system as previously described.

It will be noted that only one tube in this arrangement, the green tube, is on axis with the corrector lens and presents center obscuration. The red and blue tubes are off-axis to any degree consistent with acceptable resolution loss presented by aberrations, and to minimize additional light source obscuration, consistent with reflector and corrector sizes. The corrector lens 11 may be designed to provide only correction for spherical aberration or may have optical power so as to reduce mirror curvature.

The system as disclosed in FIGS. 2 and 3 may include variations such as a corrector design that compensates for the spherical aberration produced by the off-axis position of red and blue; a less extreme angle for the red and blue with respect to the green and compensation of the additional obscuration by enlarging the reflectors or corrector; different radii for the red and blue reflectors; primary correctors for aberrations on the red and blue CRT tube faces; larger tubes for the red and blue; different tube face radii for red and blue with respect to green; different tube positions; tubes having round faces for optical symmetry with the corrector serving as the aspect ratio mask; or any combination of the foregoing.

The CRTs may be of a small size; for example, of three or five inch diagonal screen dimension.

FIGS. 4 and 5 exemplify another system 30 of the invention having CRTs 31R, 31G, and 31B which are red, green and blue, respectively. An optical coupler is not shown, to simplify illustration. Again, the green tube is on-axis with a corrector lens.

The reflecting optic 32 comprises a base element 33 having a rear reflective surface 33a to reflect the image of the on-axis green CRT 31G. Defined on element 33 by equal spherical radii are surfaces 34 and 35. Cemented to surfaces 34 and 35 are elements 36 and 37, respectively, having rear surfaces mating with and cemented to surfaces 34 and 35, respectively. Element 36 has a front surface 36a which is a continuation of surface 35 on the same radii. Surfaces 36a and 35 are coated to selectively reflect only the color red. Element 37 has a surface 37a which is a continuation of surface 34 and formed on the same radius. Surfaces 37a and 34 form one essentially continuous concave surface which is coated to be selectively reflective only to the color blue. The axis of each CRT essentially coincides with the optical axis of its respective reflective surface. The positioning of the optic 32 and the CRTs is such that all three color images appearing on the CRTs are reflected along the axis G which coincides with the axis of corrector lens 38. Corrector lens 38 has the usual axial aperture 38a in view of the on-axis position of CRT 32G.

All three color images are reflected by the optic 32 and a composite image is formed by corrector lens 38, and thereafter reflected for projection by the mirror system as a single full color image.

In another system 40, as shown in FIGS. 6 and 7, all three red, green, and blue CRTs 41R, 41G, and 41B are off-axis C with respect to a corrector 42 and positioned within the outline of the aperture 42a in corrector 42. An optical coupler is not shown for simplicity of illustration. A reflecting and color beam splitting optic 43 comprises two elements 44 and 45. Element 44 has a blue selective concave reflecting coating on surface 44a and a rear convex surface 44b mating with concave surface 45a of element 45. A green selective reflecting coating is formed on one of surfaces 44b or 45a. Surface 45b may merely have a mirror coating or a coating selective to the color red. The CRTs are only slightly off-axis which minimizes spherical aberration. The axis of each tube is essentially coincident with the optical axis of its associated reflecting surface, and the center axis of all reflected images reside on the optical axis C of corrector lens 42.

Another embodiment 50 of the invention is shown in FIGS. 8 and 9, where a major improvement over the classical Schmidt system is obtained by eliminating light source obscuration. The CRTs 51G, 51B and 51R are positioned outside the periphery of a corrector lens 52 and directed toward a color beam splitting and reflective optic 53. All three CRTs are off-axis of corrector lens 52. The optic 53 comprises elements 54 and 55. Element 54 has a first surface 54a coated to reflect only blue, and a second surface 54b mating with surface 55a of element 55. One of surfaces 54b and 55a is coated to reflect only green. The rear surface 55b of element 55 may only be a mirror surface to reflect red. The optical axes B, G, R of the surfaces coincide with the axes of the associated CRTs. All CRTs and their respective reflecting surfaces are positioned so as to reflect along the optical axis C of corrector lens 52. To simplify illustration, the optical coupler is not shown.

In this embodiment, as in the others, the system is optimized for the color green to improve the resolution perceived by the viewer. In this embodiment one (green) or more of the reflective surfaces may be made aspheric. This will provide a noticeable improvement in resolution from the red and blue colors. The lack of center obscuration permits an effective aperture as large as f/0.6.

Another embodiment of the invention is shown in FIG. 10 where each of CRTs 61G, 61B and 61R are positioned to direct an image to a color selective reflecting surface defined on similar elements 62, 63 and portions 64a and 64b formed from a single similar element. All elements have planar surfaces. Element 62 preferably has a mirrored surface 62a, shown as the front surface, to reflect an image on green CRT 61G. Element 63 has a reflective surface 63a, shown as the front surface, selectively coated to reflect only the color red from CRT 61R.

Elements 64a and 64b are defined from a single element by cutting or otherwise forming the element to fit on either side of element 63. Surfaces 64c and 64d of portions 64a and 64b, respectively, are selectively coated to reflect only the color blue from CRT 61B. The elements are encapsulated in a plastic 65, such as acrylic, of the same refractive index as the elements 62-64, so that the resulting assembly is optically coupled. Thus, the thickness of the elements optically disappear in the assembly. The elements 62-64 may be of glass or plastic of the same refractive index selectively coated on one side to reflect only the images of one CRT. The elements may be very thin, since their primary function is to merely support a color selective reflective surface coating in the assembly. Thus, each CRT merely sees one reflective surface for its own polar. In this arrangement, using planar reflective surfaces, all optical power is placed in the corrector lens. This arrangement requires a corrector lens that has the usual center opening because of center obscuration due to on-axis position of green CRT 61G. As in the embodiment of FIG. 3, all CRT axes at the point of intersection with its respective reflecting surface reside essentially on the axis G. As shown, all CRTs are equidistant from their respective reflecting surfaces.

While the elements 62-64 are shown as having plane surfaces, the provided surfaces may be made concave, as shown in FIG. 2, using only two elements.

The elements 62-64 may be formed on identical spherical radii with parallel front and rear surfaces. In this case, the element 64 would be substantially centrally cut or formed in two parts along an arcuate line so that the cut or formed edges are matingly engaged on either side of element 63. With this arrangement, the optical power could be placed wholly in the elements or shared with the corrector.

A further modification is to eliminate the element 62 and mirror the rear surface of the plastic 65 to reflect the color green which is the only remaining color at that point.

Figure 11:
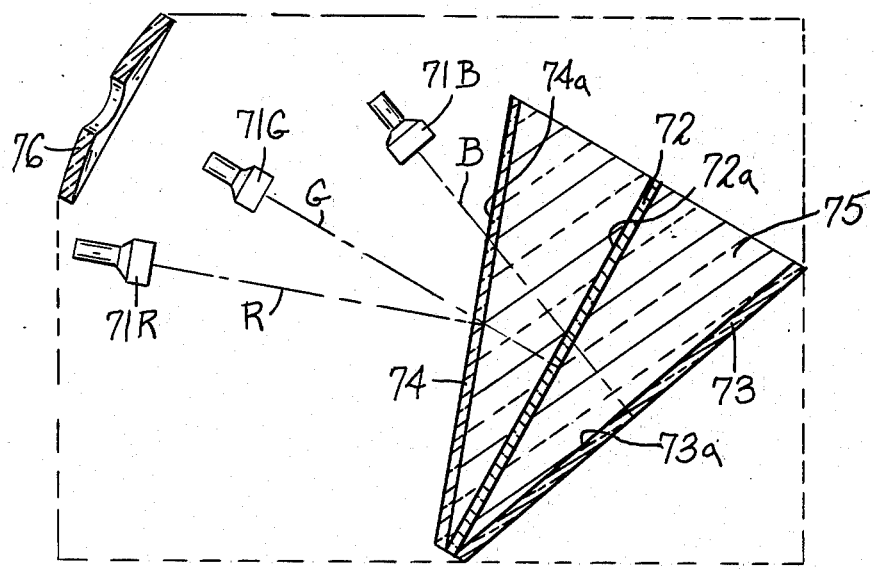

A still further embodiment of the invention is shown in FIG. 11. Here, CRTs 71G, 71B and 71R are directed at planar surface elements 72, 73, and 74, respectively. Element 72 has a green selective reflecting surface 72a, element 74 has a red selective reflecting surface 74a, and element 73 has a reflective surface 73a. The elements are encapsulated into one assembly by a clear plastic 75 having the same index of refraction as the elements 72-74. Thus, only the reflective surfaces 74a, 72a, and 73a are optically present to the images on the CRTs. The CRTs are preferably equidistant from their respective reflecting surfaces, and all CRT axes coincide with axis G at the point of contact with respective reflecting surfaces. In this case all optical power is placed in the corrector lens 76 which has the usual center opening due to the on-axis position of CRT 71G.

It will be apparent that the elements 72-74 could also be made with reflecting surfaces concave to the CRTs.

In the last two described embodiments of the invention, the elements serve only as substrates for the color selective reflective coatings thereon. Only one side of each element need be optically smooth to receive a color selective coating. The other side may be roughened to facilitate bonding to the encapsulating plastic of the same refractive index.

Systems embodying the invention present advantages in high luminous efficiency, increased resolution as well as economy with increase in viewing screen size. A change in the corrector lens can change the equivalent focal length of the system for a variety of image sizes from the same optical system and electronics receiving package.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A system for projecting a color television image comprising a plurality (n) of cathode ray tubes of different monochromatic colors, each tube having an image display screen, an optic having a plurality of successive reflective surfaces equal in number to the number of tubes, said reflective surfaces being selectively reflective to at least $n-1$ colors, said tubes and said surfaces positioned such that each surface reflects an image appearing on the screen of one tube, and a lens disposed behind said tubes to transmit a composite color image of the images reflected from said surface.

2. The system of claim 1 where said tubes are three in number, said optic comprises two elements defining three surfaces, at least two of said surfaces each selectively reflecting only a color of one cathode ray tube.

3. The system of claim 1 where said lens has a central axial aperture, one of said tubes is positioned in the outline of said aperture on axis with said lens, said one of said tubes having a green display screen.

4. The system of claim 1 where said lens has a central aperture and said three tubes are positioned in the outline of said aperture.

5. The system of claim 1 where each of said surfaces is concave with respect to its respective tube screen.

6. The system of claim 1 where said optic comprises $n-1$ nested elements providing n successive surfaces.

7. The system of claim 1 where said lens has a peripheral edge and said tubes are positioned outside of the outline of said peripheral edge.

8. The system of claim 1 wherein said optic comprises a base element having a rear reflective surface and has first and second intersecting concave surfaces on the front thereof, second and third elements, each having convex rear surfaces which mate with one of said first and second concave surfaces and having concave front surfaces which are essentially continuous with the other of said first and second concave surfaces.

9. The system of claim 1 wherein said reflective surfaces are defined on substrates bonded in fixed relation in a material of the same index of refraction as said substrates.

10. The system of claim 1 wherein said optic comprises three elements having planar surfaces, said elements disposed at angles to each other and essentially perpendicular to its respective cathode ray tube, said elements bonded together with a material of the same refractive index as said elements, a color selective reflective coating on a surface of at least two of said elements.

11. The system of claim 1 wherein said optic comprises three elements, one of said elements being essentially diametrically split to fit at an angle to another of said elements on both sides thereof whereby said two elements are disposed at angles to the axis of said lens, the third element being essentially perpendicular to the axis of said lens, each of said elements providing one of said surfaces, said elements being bonded together in fixed relation with a material of the same refractive index as said elements.

12. The system of claim 11 where each of said elements provide a surface concave to its respective cathode ray tube.